April 10, 1928.  
W. N. BOOTH  
VEHICLE WHEEL  
Filed March 16, 1925
1,665,437
2 Sheets-Sheet 1
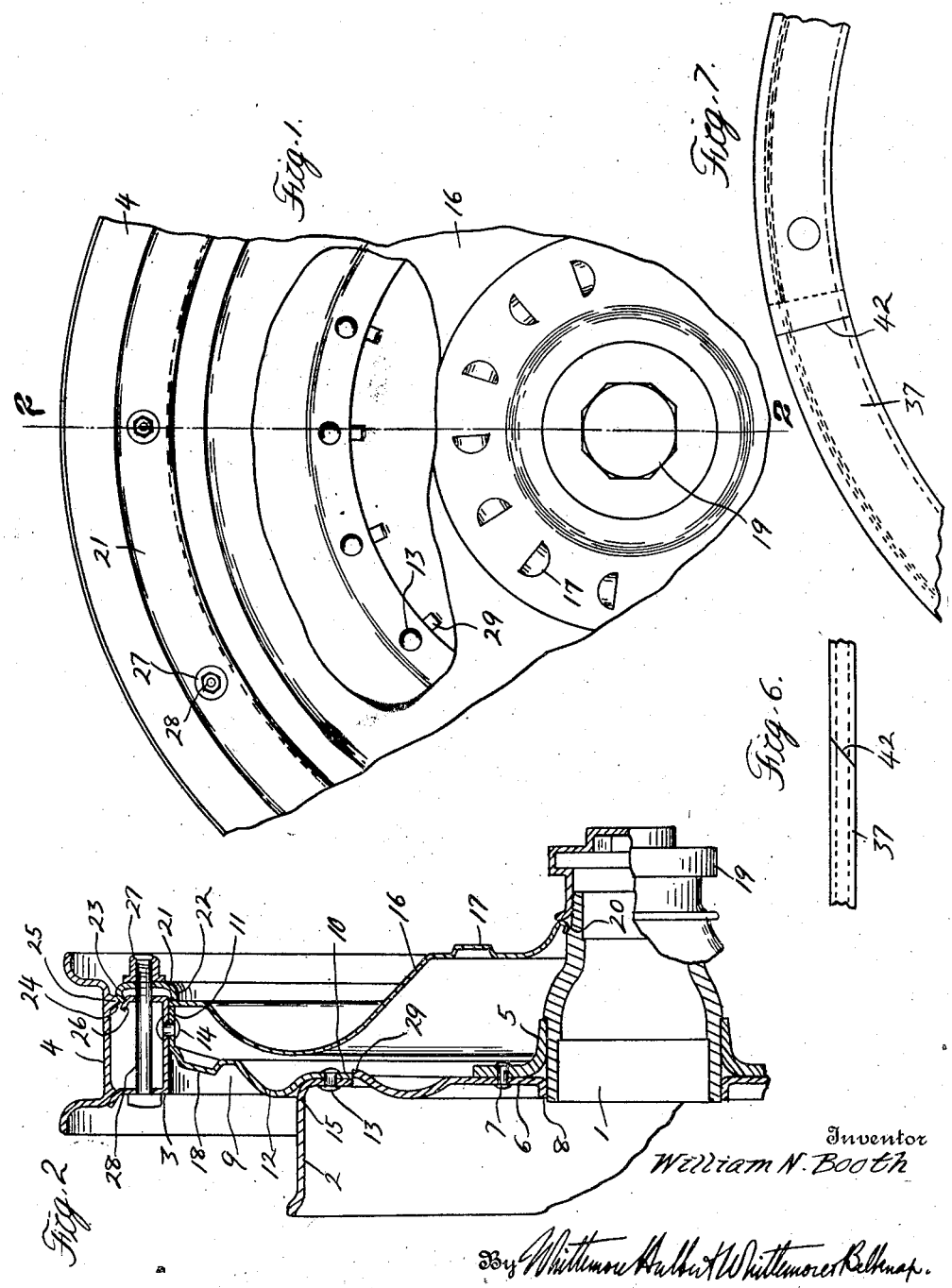

April 10, 1928.
W. N. BOOTH
VEHICLE WHEEL
Filed March 16, 1925
1,665,437
2 Sheets-Sheet 2
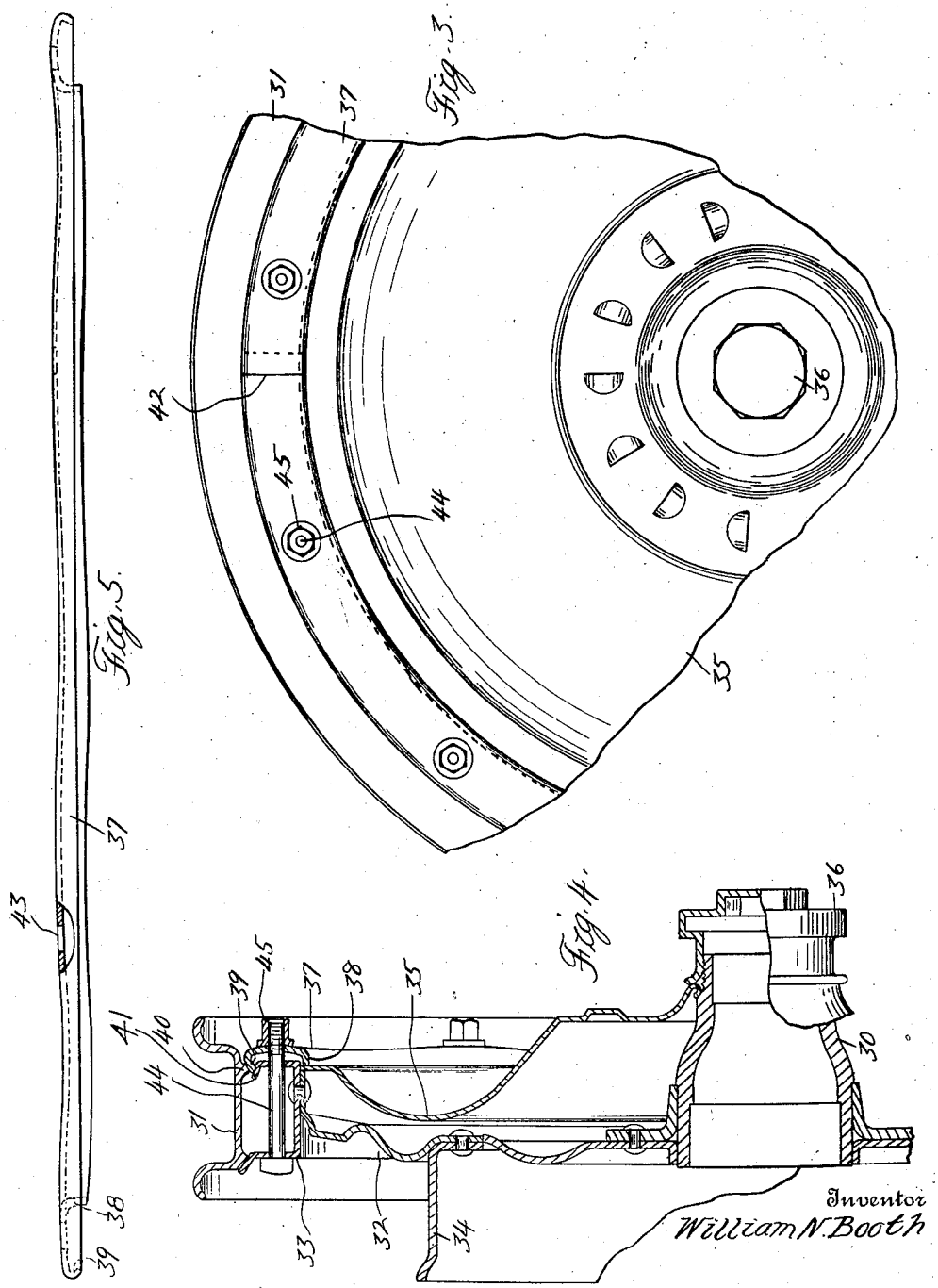
Inventor
William N. Booth
Attorneys Patented Apr. 10, 1928.

1,665,437

UNITED STATES PATENT OFFICE.

WILLIAM N. BOOTH, OF DETROIT, MICHIGAN.

VEHICLE WHEEL.

Application filed March 16, 1925. Serial No. 15,946.

The invention relates to vehicle wheels and has for one of its objects the provision of a wheel body comprising a member upon which a demountable rim is mounted and a second member upon the wheel hub and carrying the first mentioned member and provided with means for concentrically locating the first mentioned member. Another object is the provision of a ring for securing a demountable rim upon a wheel body this ring being transversely split and so arranged that when adjusted toward the wheel body its ends adjacent to the split will be in immediate proximity to each other. A further object is the provision of a ring which is transversely split and arranged to initially secure a cover plate against the wheel body and to subsequently fulcrum upon this cover plate while securing the demountable rim upon the body. With these as well as other objects in view the invention resides in the novel features of construction and combinations and arrangements of parts as more fully hereinafter set forth.

In the drawings:—

Figure 1 is a side elevation partly broken away of a portion of a vehicle wheel embodying my invention.

Figure 2 is a cross section on the line 2—2 of Figure 1.

Figures 3 and 4 are views similar to Figures 1 and 2 respectively showing a modification.

Figures 5 and 6 are profile views of the ring for securing the demountable rim and cover plate to the wheel body.

Figure 7 is a side elevation of a portion of the clamping ring where it is split.

In the vehicle wheel as shown in Figures 1 and 2, 1 is the hub, 2 the brake drum and 3 the felly, which is preferably channel-shaped, upon which is seated the demountable rim 4 for carrying the tire. The hub is provided with the annular fixed flange 5 to the inner side of which the web 6 of the brake drum is secured by suitable means such as the rivets 7. The brake drum is preferably provided with the cylindrical flange 8 seated upon the hub.

The felly 3 is mounted upon the brake drum 2 and as shown 9 is the spacing ring between the felly and the brake drum and secured thereto. This spacing ring has the inner radial portion 10, the outer cylindrical portion 11 and the intermediate curved portion 12. The radial portion 10 is connected to the outer side of the web 6 of the brake drum by suitable means such as the rivets 13, the cylindrical portion 11 is connected to the web of the channel-shaped felly 3 by suitable means such as the rivets 14 and the intermediate curved portion 12 preferably extends over the cylindrical flange 15 of the brake drum.

16 is a cover plate for the brake drum 2 and spacing ring 9, this cover plate being mounted at its inner peripheral portion upon the hub 1 and adapted to abut at its outer peripheral portion the outer edge of the cylindrical flange 11 of the spacing ring. The cover plate is spaced from the brake drum and main portion of the spacing ring and is provided in its central portion with the oppositely facing louvres 17 while the spacing ring is provided in its intermediate curved portion 12 with the oppositely facing louvres 18 which cooperate with the louvres 17 to effect a circulation of air through the space and over the brake drum upon rotation of the wheel. 19 is a hub cap preferably threaded upon the outer end of the hub and abutting the cover plate at its inner periphery for forcing this portion of the cover plate firmly upon the bevelled shoulder 20 of the hub. 21 is a clamp which in addition to forcing the demountable rim upon and securing the same to the felly secures the outer peripheral portion of the cover plate against the cylindrical flange 11 of the spacing ring. The clamp 21 is preferably a ring of substantially channel cross section having the inner leg 22 engageable with the outer side of the cover plate 16 near its outer periphery and the outer leg 23 terminating in a wedge portion 24 engageable between the outer bead 25 upon the base of the demountable rim and the flared flange 26 at the outer edge of the outer leg of the felly. This ring is forced inwardly relative to the felly by suitable nuts 27 threadedly engaging the outer ends of suitable bolts 28 extending transversely of and secured to the felly 3. The arrangement is such that during the tightening up of the nuts, the ring prior to seating the demountable rim firmly upon the felly secures the cover plate against the cylindrical flange of the spacing ring and then fulcrums upon the cover plate during the final clamping operation.

For the purpose of centering the spacing ring 9 upon the brake drum 2, the latter is preferably provided with the annular series of outwardly struck tongues 29 which form substantially square shoulders engageable with the inner periphery of the radially secured portion 10 of the spacing ring. By reason of these centering projections the intermediate curved portion 12 of the spacing ring need not be curved to engage the outer periphery of the brake drum.

The modified vehicle wheel shown in Figures 3 and 4 has the same general arrangement of parts as the vehicle wheel shown in Figures 1 and 2, 30 being the hub, 31 the demountable rim and 32, 33 and 34 the spacing ring, felly and brake drum respectively forming the support mounted upon the hub and carrying the demountable rim. 35 is the cover plate secured at its inner peripheral portion by means of the hub cap 36 and at its outer peripheral portion by means of the clamping ring 37 which further forces the demountable rim 31 toward and secures the same upon the felly 33. This clamping ring is also channel-shaped and has the inner leg 38 engageable with the cover plate 35 at its outer periphery beneath the felly and the outer leg 39 engageable between the outer bead 40 upon the base of the demountable rim and the flared flange 41 upon the outer edge of the outer leg of the felly.

For the purpose of facilitating the fulcruming of the ring upon the cover plate this ring is transversely split at 42, the split being on a bevel so that the ends of the rings overlap each other. For the purpose of maintaining these ends in close proximity to each other when the parts are in operative position the ring as shown particularly in Figure 5 has a wavy profile with the web of the ring provided with holes 43 located at the crests of the waves and the transverse split located between the adjacent crests of the waves and preferably adjacent to one of them. The bolts 44 which together with the nuts 45 secure the ring in operative position extend through the holes 43 and the nuts as a consequence abut the ring at the crests of the waves so that when they are adjusted to place the ring under stress the portions of the ring intermediate the wave crests are compressed and as a consequence the ends of the ring at the split 42 are moved into close proximity to or actually into contact with each other. Furthermore, the ring is resilient so that it will function to lock the nuts upon the bolts.

With this arrangement it will be seen that the cover plate is firmly secured in place at its outer periphery irrespective of the position through a limited range of the demountable rim upon the felly inasmuch as the clamping ring fulcrums upon the cover plate. It will also be seen that the transverse split in the clamping ring facilitates this fulcruming movement and that the wavy profile of the clamping ring with the adjacent crests of the waves on opposite sides of the transverse split provides for maintaining the ends of the ring either in actual contact with each other or in immediate proximity to each other. It will further be seen that the clamping ring functions to lock the nuts upon the bolts.

What I claim as my invention is:

1. In a vehicle wheel, the combination with a wheel body and a demountable rim mounted upon said wheel body, of a ring for securing said rim upon said wheel body, said ring having a wavy profile and being transversely split intermediate the crests of adjacent waves and means for adjusting said ring toward said wheel body, including members engaging said ring at the crests of the waves.

2. In a vehicle wheel, the combination with a wheel body and a demountable rim mounted upon said wheel body, of a ring for securing said demountable rim upon said wheel body, said ring having a wavy profile and being transversely split on a bevel intermediate the crests of adjacent waves, and means for adjusting said ring toward said wheel body, including members engaging said ring at the crests of the waves whereby the ends of said ring adjacent to the split are maintained in contact when said ring is stressed.

3. In a vehicle wheel, the combination with a wheel body, a demountable rim mounted upon said wheel body and a cover plate, of a ring for securing said demountable rim and cover plate upon said wheel body, and means for adjusting said ring toward said wheel body, including members engaging said ring, said ring being transversely split and arranged to initially clamp said cover plate against said wheel body and subsequently fulcrum upon said cover plate while being adjusted toward said wheel body.

4. In a vehicle wheel, the combination with a wheel body, a demountable rim mounted upon said wheel body and a cover plate, of a ring for securing said demountable and cover plate upon said wheel body, said ring having a wavy profile and being transversely split intermediate the crests of adjacent waves, and means for adjusting said ring toward said wheel body, including members engaging said ring at the crests of the waves.

5. In a vehicle wheel, the combination with a wheel body, a demountable rim mounted upon said wheel body and a cover plate, of a channel-shaped ring for securing said demountable rim and cover plate upon said body, said ring having a wavy profile and being transversely split on a bevel intermediate the crests of adjacent waves, and means for adjusting said ring toward said wheel body, including members engaging said ring at the crests of the waves.

In testimony whereof I affix my signature.

WILLIAM N. BOOTH.